United States Patent Office 3,232,710
Patented Feb. 1, 1966

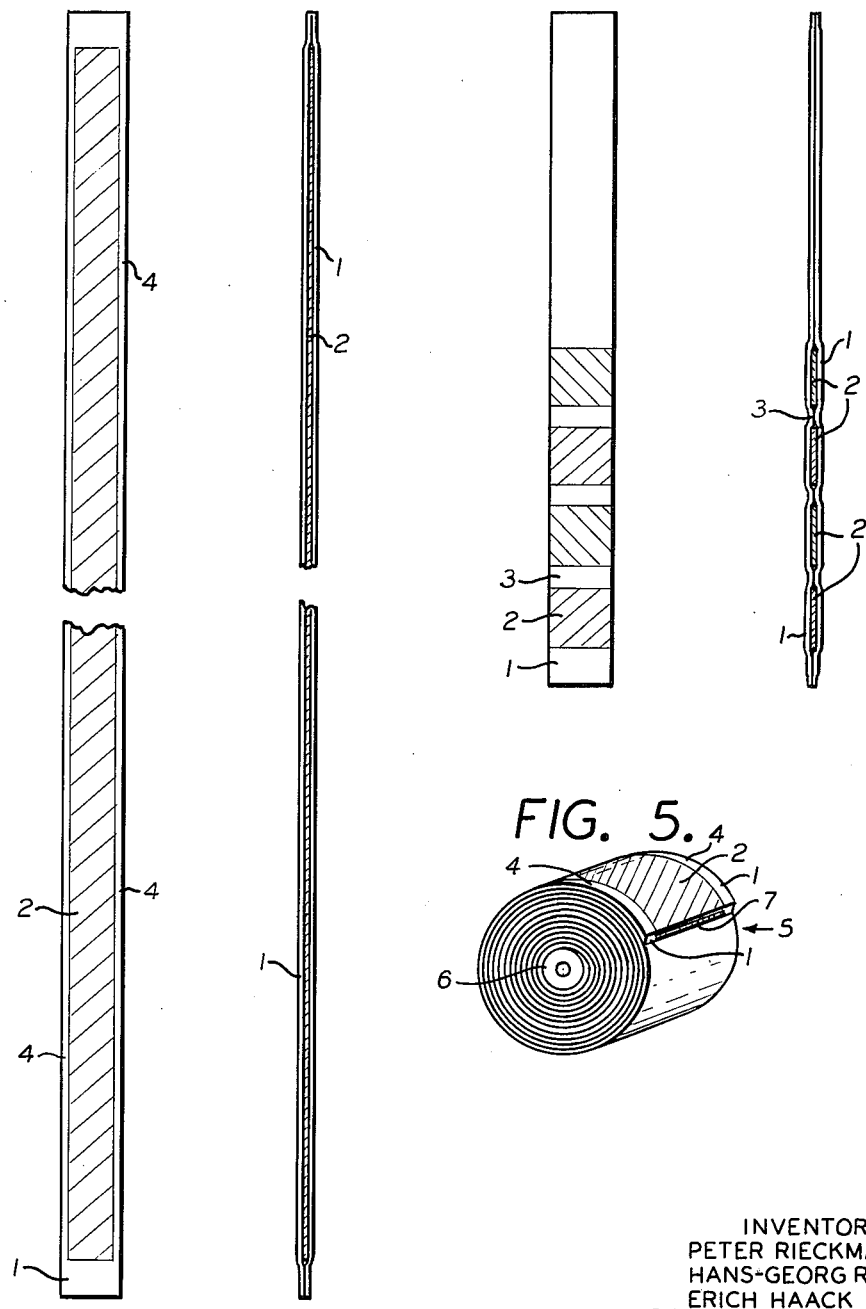
Feb. 1, 1966  P. RIECKMANN ETAL  3,232,710
INDICATOR AND METHOD FOR MANUFACTURING THE SAME
Filed March 5, 1963
INVENTORS
PETER RIECKMANN
HANS-GEORG REY
ERICH HAACK
ATTORNEYS.

3,232,710
INDICATOR AND METHOD FOR MANU-
FACTURING THE SAME
Peter Rieckmann, Mannheim-Waldhof, Hans-Georg Rey,
Mannheim, and Erich Haack, Heidelberg, Germany,
assignors to C. F. Boehringer & Soehne, G.m.b.H.,
Mannheim-Waldhof, Germany
Filed Mar. 5, 1963, Ser. No. 262,827
Claims priority, application Germany, Mar. 8, 1962,
B 66,255
14 Claims. (Cl. 23—253)

This invention relates to new articles of manufacture and to new methods of manufacturing the same. More particularly, the invention relates to test papers in a form suitable for use in carrying out rapid analytical determinations and which may be stored over prolonged periods without any effect on their reliability.

Test papers, as for example indicator papers for making rapid determinations of pH, tumeric paper for the detection of boric acid, potassium iodide-starch paper for the detection of oxidants, lead acetate paper for detecting sulfides, etc. are well known and extensively used. In recent years, there have been proposed various test papers for detecting glucose, acetone, albumin, etc. in biological fluids which have acquired great importance because they make possible rapid, on-the-spot determinattions and furthermore, because such determinations can be carried out by untrained personnel as routine matters.

The stability of the reagents incoporated into the paper is of the greatest importance with respect to the reproducibility of the results thereby obtained. The chemicals incorporated into the papers have an objectionable tendency to undergo oxidation and/or reduction reactions as well as other decomposition phenomena on storage and/or exposure to atmospheric humidity. As a result, the papers are rendered useless or even worse may give erroneous results. The use of these test papers is, therefore, limited by their low stability.

This invention has as an object a simple and practical method for increasing the stability of test paper materials.

A further object is a method for this purpose applicable to the treatment of preformed test paper strips.

A still further object is a method of treating test paper strips which, in addition to the above-mentioned modification of properties, confers on the test paper strips other valuable characteristics.

Other objects will appear hereinafter.

These objects are accomplished, test papers having an almost unlimited shelf life being obtained by sealing the test paper strips between sheets of water insoluble plastic. Surprisingly, with test strips sealed in this manner the determinations can be carried out just as rapidly as with the conventional unsealed papers. On removing a small section of sealed test strip from a large roll thereof, only an extremely small area unprotected by plastic is produced. It could not be expected that this small area represented by the torn edge would be sufficient to draw the solution to be analyzed up into the covered absorbent test strip paper within a matter of seconds, but rather it was to be expected that the air entrapped in the paper and which can only escape with difficulty due to the plastic covering would offer resistance to the rise of the solution.

An important advantage of the covered test strips consists in that the reaction involved in the determination takes place undisurbed in a "microchamber." Thus, with the ordinary conventional test papers, the strip dries very rapidly, at least in the marginal areas, after it has been immersed and removed from the solution to be tested and in many cases this has a disturbing effect on the reaction. Further, the color reactions in the new test strips are clearer and easier to see than in the case of ordinary test paper strips, since the clear plastic cover imparts a gloss to the colors.

The process of the invention is also suitable for the manufacture of multiple test strips which permit carrying out a number of reactions simultaneously. While multiple test strips have already been proposed, the same consist of a filter paper strip to which various reagents have been applied, the individual test areas being seperated one from the other by impregnation with a water-repellent material such as paraffin or a cellulose ester (Brit. Pat. 867,192; cf. also U.S. Pat. 2,129,754).

The preparation of the test strips characterized by increased stability and therewith a prolonged shelf life in accordance with the invention takes place by positioning the desired number of different individual test paper strips side by side observing a predetermined spacing between the strips. The strips are then sealed between two plastic bands, and the resulting plastic enclosed paper strips sectioned by cuts made perpendicular to the length of the sealed bands. In this manner plastic enclosed test paper strips are produced which are easy to handle. The test paper is protected by plastic other than at the cut edges yet the solutions to be tested are absorbed quickly and reliably by the absorbent paper.

For preparation of the plastic enclosed test strips, there may be used any of the film forming plastics which are insoluble in water, such as for example polyvinyl chloride, polyterephthalic acid esters, polyterephthalic acid ester films coated with polyethylene, polypropylene and superpolyamides. The choice of the plastic is dependent primarily on its being readily weldable and of course on its cost. Most preferably, polyvinyl chloride and polyethylene coated polyterephthalic acid ester plastics are used.

The sealing is carried out in the conventional manner as for example by flash welding, hot contact welding or by high frequency welding.

It has been found that the color reaction can be more readily evaluated if one of the two plastic covering layers is colored.

It is also possible in accordance with the invention to employ a plastic coated paper instead of one of the plastic covering whereby there is provided an opaque background for the test strip.

In certain instances, the solutions to be tested act to reduce the absorbency of the test paper. In accordance with the invention this tendency can be counteracted by providing the plastic coverings with small openings or holes whereby a small portion of the paper's surface is exposed to the solution in addition to the cut edge. However, in the usual determinations, the cut or torn edges of the sealed test paper provide for a sufficiently rapid absorption of the solution being analyzed that the use of perforated plastic sheets is totally unnecessary.

The sealed test strips can be prepared so as to include built-in color standards.

Standard color scales are of great importance in evaluating a reaction as evidenced on a test paper, as for example in the determintion of pH, or in the semiquantitative determination of albumin or glucose. Even in those cases where it is desired only to determine whether or not the test solution contains a particular substance, it is desirable to have available for comparison at least a color scale for the negative and for the weakly positive reactions. This is of particular importance, for example, in the case of test papers used for determining the presence of nitrite and which test utilizes the principle of the diazotizing and coupling reaction of Gries and Ilosvay (Zeitschrift Analytischer Chemie 33, 222/1894). The nitrite test is in general used for testing drinking water, milk and urine for determining the presence of contamination or infection due to *Escherichia coli*. It is precisely where turbid liquids have to be analyzed that color scales provided on separate sheets of paper have proven inadequate. Further as is well known, following the consumption of certain medicaments or as a result of metabolic changes with certain pathological conditions, urine may have imparted thereto a red color so that a color test based on the production of a red color, as for example the nitrite test, is bound to give false results. In order in such cases to compensate for the differences in color which are attributable to the inherent color of the solution being tested, the color scale must itself also be immersed into that solution.

While it has already been suggested to produce paper strips for determining the pH in which the test strip and the color scale both are present, together in the one paper strip, the manufacture of such test papers is very difficult and expensive (German Patent 909,504 and German Patent 1,094,017).

In accordance with the present invention, combinations of test strips and color scales having an unlimited shelf life can be prepared in a very simple and easy manner by sealing test paper strips together with the appropriate color scales between sheets of plastic. Most preferably the test paper strips and the color scales are arranged one next to the other at spaced intervals in a desired arrangement between two plastic covering layers and the sheets of plastic sealed by the heat flash, hot contact, or high frequency method. The water-insoluble plastics as above set out can be used for the covers. Perpendicular cuts of the sealed plastic provide individual plastic strips containing both the test paper and the color scale or scales. In this manner, there are produced plastic strips which are easy to handle and in which small sections of the test paper and of the color scale are enclosed. The small cut edges expose enough of the absorbent papers to enable the solutions being tested to be absorbed rapidly and reliably. Further in the case of turbid solutions, a filtration of the solution being tested is achieved at the cut edge.

It is possible in accordance with the invention to provide any number of standard color test papers, the number to some extent being dependent on the test reaction involved. In the case of simple tests, usually two standard colors will suffice, one for the negative and one for the weakly positive reaction. In the case of semiquantitative determinations, however, several standard colors are necessary, including one which corresponds to a particularly critical concentration of the substance to be analyzed.

It is further possible in accordance with the invention to provide either on the plastic cover or on the paper strip or both the information, namely the identification of the test strip, the nature of the standard colors, procedure to be followed, etc. so that the test can be carried out without recourse to separate instructions or without the need for any reference material.

To enhance the reliability of the determination to be carried out, it is desirable to employ color scales or standards for comparison prepared using the same wettable paper as is used for the test paper strip. However, while the net result is to produce a testing unit with an excellent assurance of a satisfactory analytical result, it is to be understood that standards or color scales prepared using different papers or in fact with a pre-established color are also highly desirable.

As indicated above, while the test papers for making multiple analytical determinations can be prepared by forming an assembly of the various strips, in a side by side arrangement with a superposed upper and lower water insoluble cover layer, with the strips therebetween and the plastic layers sealed at their longitudinal edge portions in order to produce a test paper of greater stability, sensitivity and reliability, it is preferable to provide for the longitudinal welding together of the plastic film layers between each individual paper strip.

A more comprehensive understanding of the invention may be obtained by referring to the following illustrative examples, which are not intended, however, to be unduly limitative of the invention.

EXAMPLE 1

*Manufacture of a sealed glucose test strip*

(a) Composition of the impregnating solution:

| | Parts |
|---|---|
| O-tolidine | 0.4 |
| Fatty acid-polyethylene glycol ester | 0.08 |
| Peroxidase | 0.012 |
| Glucose oxidase | 1.3 |
| Tartrazine | 0.09 |
| Ethanol (44%) | 100.00 |

Filter paper (Schleicher & Schull No. 2316) is impregnated with a solution as above set out by running such a paper band having a width of about 60 cm. through a bath of the impregnating solution and thereafter drying the paper with hot air or infra-red light. The dried paper is formed into rolls and the rolls are cross-cut to the desired width of 5 mm.

(b) The glucose test paper strips so obtained are sandwiched at a distance of 5 mm. apart between two sheets of polyethylene coated polyterephthalic acid ester film having a width of 30 cm. and the resulting sandwich passed between two rollers, one or both of which are heated. The plastic sheets are thereby welded together and the paper strip is welded on one or both sides to the plastic sheeting by the hot contact. Shallow grooves are provided on the rollers to assure that the portions of the plastic sheets between the strips of paper are firmly welded together. The plastic bands with the paper strips sealed therein are wound into rolls which then are cut crosswise so that each resulting narrow roll contains a securely sealed-in test strip having a width of about 10 mm.

If such a strip is torn against a sharp-toothed cutter blade and the torn edge of the piece is briefly immersed in a solution as for example of urine containing glucose, the liquid is instantly drawn upwardly by the yellow paper strip to a distance of 2 to 3 cm. and, depending on the glucose content, there is developed a more or less intense green color in from 1 to 2 minutes. In this manner, the presence of glucose can be clearly detected even when the same is present in a concentration of less than 0.1%. The glucose content can be quantitatively estimated by comparing the colored strip to a color comparison scale.

EXAMPLE 2

*Manufacture of a multiple test strip for use in determining glucose, albumin, and pH*

(a) Glucose test paper strips are prepared as disclosed in Example 1a above.

(b) *Albumin test paper strips.*—Composition of the impregnating solution:

| | Parts |
|---|---|
| Citric acid | 12.5 |
| Tert-sodium citrate dihydrate | 12.5 |
| Dioctyl sodium sulfosuccinate | 0.03 |
| Tetrabromo-phenolphthalein ethyl ester | 0.01 |
| Ethyl alcohol | 50.00 |
| Distilled water to make | 100.00 |

Filter paper (Schleicher & Schull No. 2316) is impregnated with the impregnating solution as just described in the conventional manner and thereafter the filter paper is dried and cut. The resulting yellowish test papers are colored green by albumin solutions (detection threshold about .1%).

(c) *pH Test paper strips.*—Composition of the impregnating solution:

| | Parts |
|---|---|
| Bromothymol blue | 0.05 |
| Phenolphthalein | 0.025 |
| Methyl red | 0.004 |
| Methanol | 100.00 |

The test paper strips produced in the conventional manner are characterized by good color variations between pH 5 and pH 10:

pH 5—reddish orange
pH 6—yellow orange
pH 7—olive green
pH 8—bluish green
pH 9—blue
pH 10—violet blue (d) The sealing of the test paper strips between the plastic sheets is carried out as described above in Example 1b, but the three test paper strips to be combined (glucose, albumin, and pH) are sealed into the plastic in sets preserving a spacing of about 3 mm. between strips. The sets are separated from one another by a greater distance, this spacing being selected with a view to the final overall length of the finished test strips and preferably, as in this instance, at a distance of 6 cm. Using a plastic band which is 30 cm. wide, it is possible to seal in five such sets of test papers. The sealed sandwich, composed of test strips and plastic is then slit lengthwise into 6 cm. strips which in turn are cut cross-wise into strips 5 millimeters wide. The 6 cm. x 5 mm. strips so formed constitute the finished test strip combination.

EXAMPLE 3

*Manufacture of sealed nitrite test strips provided with a color scale*

(a) *Manufacture of test paper.*—10 grams of acid α-naphthylammonium oxalate (cont. 1%, 2,6-di-tert-butyl-4-methyl-phenol) are dissolved in 2.5 liters of methanol and the solution added to a solution of 25 g. sulfanilamide and 25 g. oxalic acid in 2.5 liters of acetone. The reagent solution obtained in this manner is used to impregnate filter paper (Schleicher & Schüll No. 2312) by running a band of the paper about 60 cm. wide through the liquid and thereafter drying the impregnated band with hot air or infrared light. The dried paper is rolled up and the rolls are cut cross-wise into strips having a width of 5 mm. The substantially colorless test papers are colored red by nitrite solutions (sensitivity about 5 parts in 100,000 of $NO_2^-$).

(b) *Comparison color paper for negative $NO_2$ reaction.*—Filter paper (Schleicher & Schüll No. 2312) is impregnated with a solution containing 0.01 g. tetraidofluorescein-sodium salt (red food color No. 4, Federal German Coloring Law of December 19, 1959) and 0.1 gram of 1-aminobenzene-4-sulfo-acid 2-oxynaphthaline-6-sulfo-acid sodium (orange food color No. 2, Federal German Coloring Law of December 19, 1959) in 5 liters of methanol. The paper is thereafter dried and cut into strips 5 mm. wide.

(c) *Comparison color paper for a weakly positive $NO_2$ reaction.*—Schleicher & Schüll No. 2312 filter paper is impregnated with a solution of 0.125 g. tetraiodofluorescein-sodium salt (red food color No. 4, Federal German Coloring Law of December 19, 1959) in 5 liters of methanol, dried and cut to size.

(d) *Sealing of the paper strips.*—The test strips [(a) above together with the comparison colors (b) and (c)] are now sandwiched between two polyethylene coated polyterephthalic acid ester sheets and the sandwich passed between two rollers, one or both of which are heated. The plastic is welded together and to the paper strip on one or both sides thereof. Shallow grooves on the rollers provide for the reliable welding of the plastic sheets in the areas between the paper strips.

The three paper strips are sealed at about 2 mm. apart in sets. The sets are separated by greater distances, which distances are based on the final overall length of the test strips in this instance 6 cm. A sandwhich 30 cm. wide can contain 5 such sets of test paper strips. The sandwich is then slit lengthwise with sharp knives into ribbons 6 cm. wide, which in turn are cut crosswise into strips 5 mm. wide.

Thus, in this example each final test strip has sealed in at one end 3 pieces of paper about 5 x 5 mm. in size, spaced 2 mm. apart. One of the outermost paper strips represents the comparison color for the negative $NO_2$ reaction, the middle strip is the test paper, and the other outer strip represents the comparison color by a barely positive $NO_2$ reaction. The production in the intermediate test strip of any more intense coloration can plainly be designated as a strongly positive reaction.

The invention is further described in reference to the accompanying drawing, wherein:

FIG. 1 is a view of a tape according to the invention of indefinite length;

FIG. 2 is a side view of the tape shown in FIG. 1;

FIG. 3 is a view of a strip cut from a tape having multiple indicators or indicators and color scales;

FIG. 4 is a side view of the strip shown in FIG. 3; and

FIG. 5 is a view of a roll of a continuous length of indicator tape according to the invention.

Refering to FIG. 1 and FIG. 2, the test tape there shown comprises the indicator 2 sandwiched between the two pieces of plastic 1, and the plastic strips are joined together, as by heat sealing, along the edge portions 4.

In the embodiment depicted in FIG. 3, multiple indicators or indicators and color scales are included. The showing in FIG. 3 does not correspond with the showing in FIG. 1, but rather corresponds with a test piece as would be obtained from the indicator shown in FIG. 1 by making cross-wise cuts in the tape shown in FIG. 1. In FIG. 3, the element 2, which can be indicators or color scale elements, are sandwiched, at spaced intervals, between the plastic material 1, and the plastic material is joined together as by heat sealing, at the spaces 3 intermediate the elements 2.

Referring to FIG. 5, a continuous length of test tape such as is illustrated in FIG. 1, is shown formed into a roll 5 on the spool 6. As is illustrated here, the plastic layers 1 form an envelope about the indicator 2, the envelope being open at the end 7. As provided initially, the tape can be sealed at the outer end thereof. Upon first using tape from the roll, the outer end can be opened by making a crosswise cut, and thereafter, as pieces are removed from the roll for use, the outer end moves in corresponding fashion back along the tape, and can remain open.

We claim:

1. Analytical indicator characterized by prolonged shelf life comprising a substantially plane paper sheet having a wettable surface impregnated with a reagent for producing a contrasting color with respect to said paper sheet on spreading of a liquid containing the substance of interest thereover as visual evidence of the presence of said substance of interest in said liquid, said indicator including super-posed upper and lower layers of a water-insoluble plastic material, with the paper sheet therebetween, said upper and lower plastic layers overlying, respectively, substantially the entire upper and lower surfaces of the paper, said plastic layers extending beyond two opposite edge portions of the test paper and being joined along the edges thereof disposed outwardly of the strip forming a close-fitting closure about the test paper, at least one end of the closure being open, said test paper being united to at least one surface of said plastic layers.

2. Analytical indicator characterized by prolonged shelf life comprising a substantially plane paper sheet having a wettable surface impregnated with a reagent for producing a contrasting color with respect to said paper sheet on spreading of a liquid containing the substance of interest thereover as visual evidence of the presence of said substance of interest in said liquid, said indicator including super-posed upper and lower layers of a water-insoluble plastic material, with the paper sheet therebetween, said upper and lower plastic layers overlying, respectively, substantially the entire upper and lower surfaces of the paper and extending beyond two opposite edges of the test paper and being joined along the edges thereof disposed outwardly of the strip forming a close-fitting closure about the test paper, at least one end of the closure being open.

3. Analytical indicator according to claim 2 wherein said water insoluble plastic is a member selected from the group consisting of polyvinyl chloride, polyterephthalic acid esters, polypropylene, superpolyamides, and polyethylene coated polyterephthalic acid esters.

4. Analytical indicator according to claim 2 wherein one of said water-insoluble plastic sheets comprises a plastic coated paper.

5. Analytical indicator according to claim 2 wherein said paper sheet is impregnated with a solution comprising:

| | Parts |
|---|---|
| O-tolidine | 0.4 |
| Fatty acid-polyethylene glycol ester | 0.08 |
| Peroxidase | 0.012 |
| Glucose oxidase | 1.3 |
| Tartrazine | 0.09 |
| Ethanol (44%) | 100.00 |

6. Analytical indicator according to claim 2 wherein said paper sheet is impregnated with a solution comprising:

| | Parts |
|---|---|
| Citric acid | 12.5 |
| Tert-sodium citrate dihydrate | 12.5 |
| Dioctyl sodium sulfosuccinate | 0.03 |
| Tetrabromo-phenolphthalein ethyl ester | 0.01 |
| Ethyl alcohol | 50.00 |
| Distilled water to make | 100.00 |

7. Analytical indicator according to claim 2 wherein said paper sheet is impregnated with a solution comprising:

| | Parts |
|---|---|
| Bromothymol blue | 0.05 |
| Phenolphthalein | 0.025 |
| Methyl red | 0.004 |
| Methanol | 100.00 |

8. Analytical indicator according to claim 2 wherein said paper sheet is impregnated with a solution comprising the admixture of a solution of 10 grams of acid α-naphthyl-ammonium oxalate (containing 1% 2,6-di-tert-butyl-4-methyl-phenol) in 2.5 l. methanol with a solution of 25 g. sulfanilamide and 25 g. oxalic acid in 2.5 l. acetone.

9. An indicator including a series of inter-connected analytical test paper units characterized by prolonged shelf life comprising a plurality of substantially plane paper sheets having wettable surfaces impregnated with a reagent for producing a contrasting color with respect to said paper sheets on spreading of the liquid containing the substance of interest thereover as visual evidence of the presence of said substance of interest in said liquid, said indicator including super-posed upper and lower elongated layers of water-insoluble plastic material, with the paper sheets disposed at spaced intervals therebetween along the length of said layers, said upper and lower plastic layers overlying, respectively, substantially the entire upper and lower surfaces of the paper and being joined along transverse portions thereof along the transverse edge portions of each paper sheet, forming a close-fitting closure about each sheet, at least one longitudinal edge portion of each closure being open.

10. An indicator having prolonged shelf life characteristics comprising a substantially plane paper sheet having a wettable surface impregnated with a reagent for producing a contrasting color with respect to said paper sheet on spreading of the liquid containing the subject of interest thereover as visual evidence of the presence of said substance of interest in said liquid and at least one paper sheet comprising a color comparison scale, said indicator including super-posed upper and lower elongated layers of water-insoluble plastic material, with the paper sheets disposed at spaced intervals therebetween along the length of said layers, said upper and lower plastic layers overlying, respectively, substantially the entire upper and lower surfaces of the paper and being joined along transverse portions thereof along the transverse edge portions of each paper sheet forming a close-fitting closure about each sheet, at least one longitudinal edge portion of each closure being open.

11. An indicator for carrying out multiple determinations having prolonged shelf life characteristics comprising at least two substantially plane paper sheets having wettable surfaces, each of said paper sheets having been impregnated with a reagent for producing a contrasting color respectively with respect to said paper sheet on spreading of a liquid containing the subject of interest thereover as visual evidence of the presence of said substance of interest in said liquid, said indicator including super-posed upper and lower elongated layers of water insoluble plastic material, with the paper sheets disposed at spaced intervals therebetween along the length of said layers, said upper and lower plastic layers overlying, respectively, substantially the entire upper and lower surfaces of the paper and being joined along transverse portions thereof along the transverse edge portions of each paper sheet forming a close-fitting closure about each sheet, at least one longitudinal edge portion of each closure being open.

12. Indicator according to claim 11 comprising three of said wettable paper sheets, each of said paper sheets having been impregnated with one of the following solutions:

(1)

| | Parts |
|---|---|
| O-tolidine | 0.4 |
| Fatty acid-polyethylene glycol ester | 0.8 |
| Peroxidase | 0.12 |
| Glucose oxidase | 1.3 |
| Tartrazine | 0.09 |
| Ethanol (44%) | 100.00 |

(2)

| | Parts |
|---|---|
| Citric acid | 12.5 |
| Tert-sodium citrate dihydrate | 12.5 |
| Dioctyl sodium sulfosuccinate | 0.03 |
| Tetrabromo-phenolphthalein ethyl ester | 0.01 |
| Ethyl alcohol | 50.00 |
| Distilled water to make | 100.00 |

(3)

| | Parts |
|---|---|
| Bromothymol blue | 0.05 |
| Phenolphthalein | 0.025 |
| Methyl red | 0.004 |
| Methanol | 100.00 | to thereby form three differently impregnated paper sheets.

13. Analytical test tape of indefinite length characterized by prolonged shelf life comprising an indicator paper in strip form, and upper and lower strips of hermetically sealing sheet material disposed one above and one below the indicator paper strip covering the same in close-fitting overlying relation, said layers extending beyond the width of the indicator paper strip and being joined together along longitudinal edge portions outwardly of the strip, said layers being transversely disconnected at one end of the tape, providing an opening for access to the indicator paper, at least one of the said strips of sealing sheet material being transparent.

14. A continuous length of analytical test tape according to claim 13, the tape being wound into a roll.

References Cited by the Examiner

UNITED STATES PATENTS

| | | |
|---|---|---|
| 2,229,155 | 1/1941 | Wenker. |
| 2,379,459 | 7/1945 | Schreiber et al. |
| 2,567,445 | 9/1951 | Parker. |
| 2,823,984 | 2/1958 | Mavrodineanu. |
| 2,838,377 | 6/1958 | Fonner. |
| 2,981,606 | 4/1961 | Keston. |
| 2,998,306 | 8/1961 | Huyck et al. ____ 195—103.5 X |
| 3,001,915 | 9/1961 | Fonner. |

FOREIGN PATENTS

| | | |
|---|---|---|
| 831,894 | 4/1960 | Great Britain. |

MORRIS O. WOLK, *Primary Examiner.*

JAMES H. TAYMAN, JR., *Examiner.*

UNITED STATES PATENT OFFICE
CERTIFICATE OF CORRECTION

Patent No. 3,232,710                     February 1, 1966

Peter Rieckmann et al.

It is hereby certified that error appears in the above numbered patent requiring correction and that the said Letters Patent should read as corrected below.

Column 5, line 56, for "tetraido-" read -- tetraiodo- --; line 72, for "and (c)" read -- and (c) above --; column 6, line 18, for "color by" read -- color for --; line 32, for "Refering" read -- Referring --; line 42, for "element 2" read -- elements 2 --.

Signed and sealed this 3rd day of January 1967.

(SEAL)
Attest:

ERNEST W. SWIDER
Attesting Officer

EDWARD J. BRENNEJ
Commissioner of Patents

Notice of Adverse Decision in Interference

In Interference No. 95,899 involving Patent No. 3,232,710, P. Rieckmann, H. G. Rey and E. Haack, Indicator and method for manufacturing the same, final judgment adverse to the patentees was rendered Oct. 30, 1968, as to claims 1, 2, 4, 9, 10, 11 and 13.

[*Official Gazette March 11, 1969.*]